March 31, 1953 T. R. SMITH 2,632,967
IRONER UNIT
Filed Dec. 4, 1948 7 Sheets-Sheet 1

INVENTOR.
Thomas R. Smith,
BY
Wilkinson, Huxley, Byron & Hume
Attys.

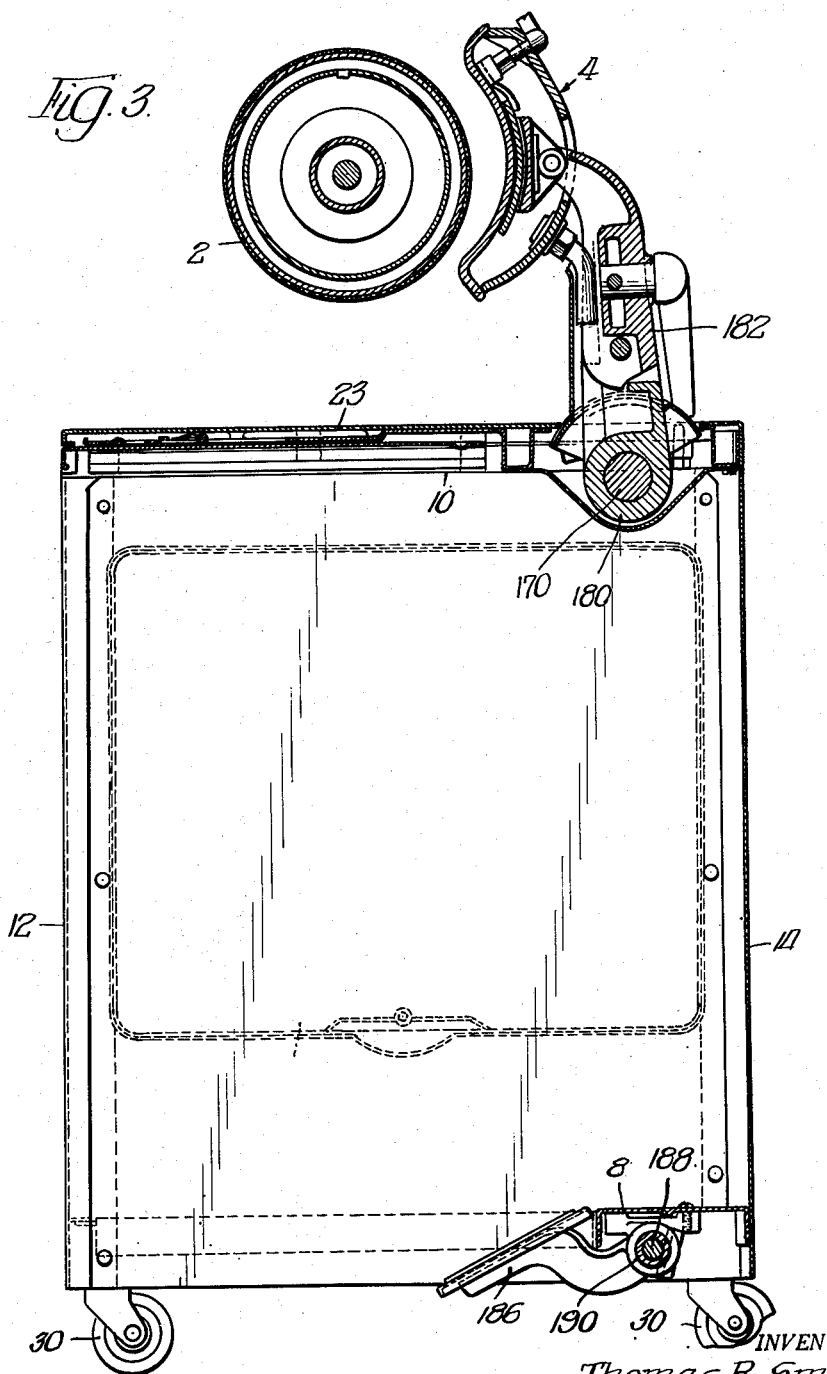

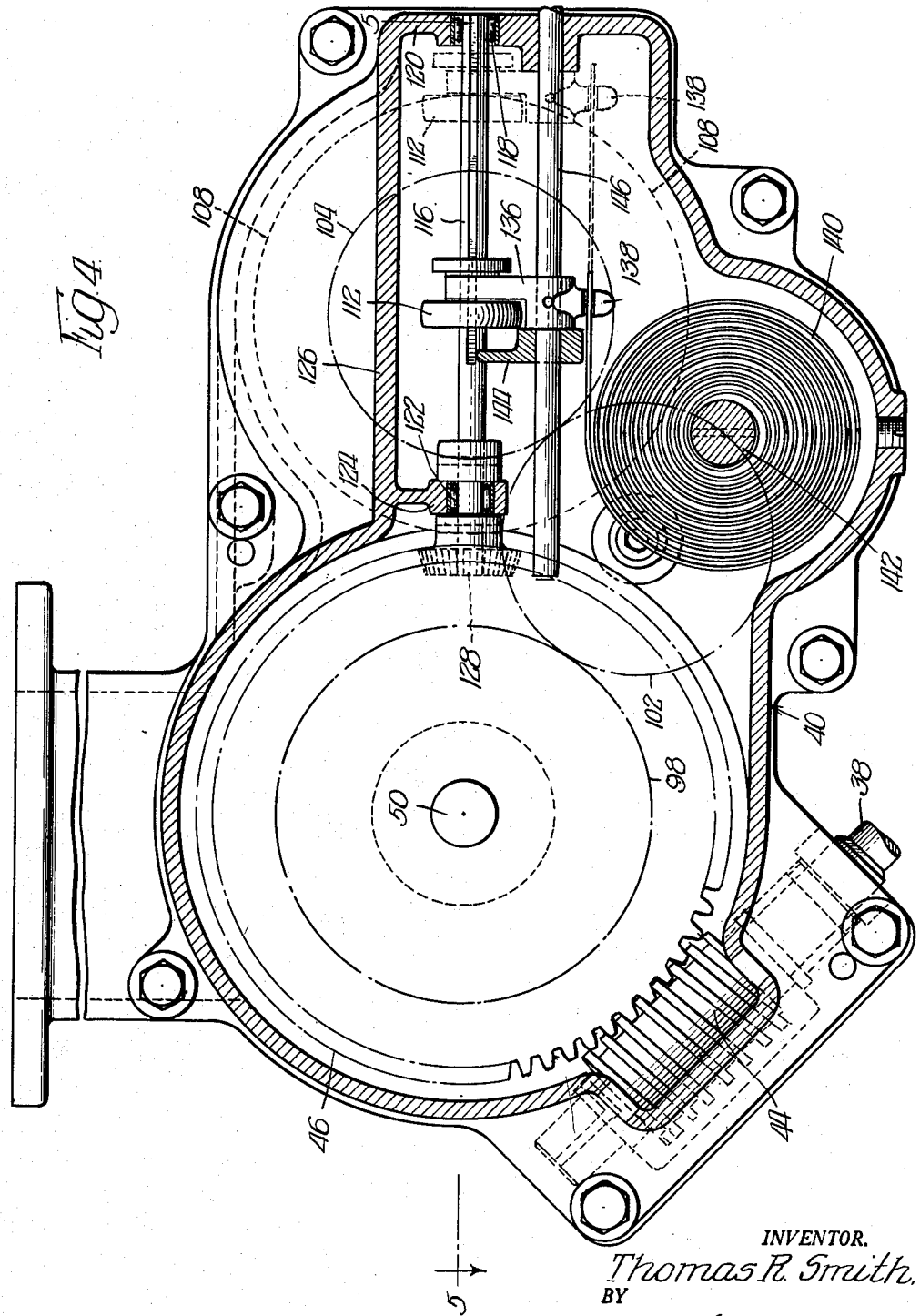

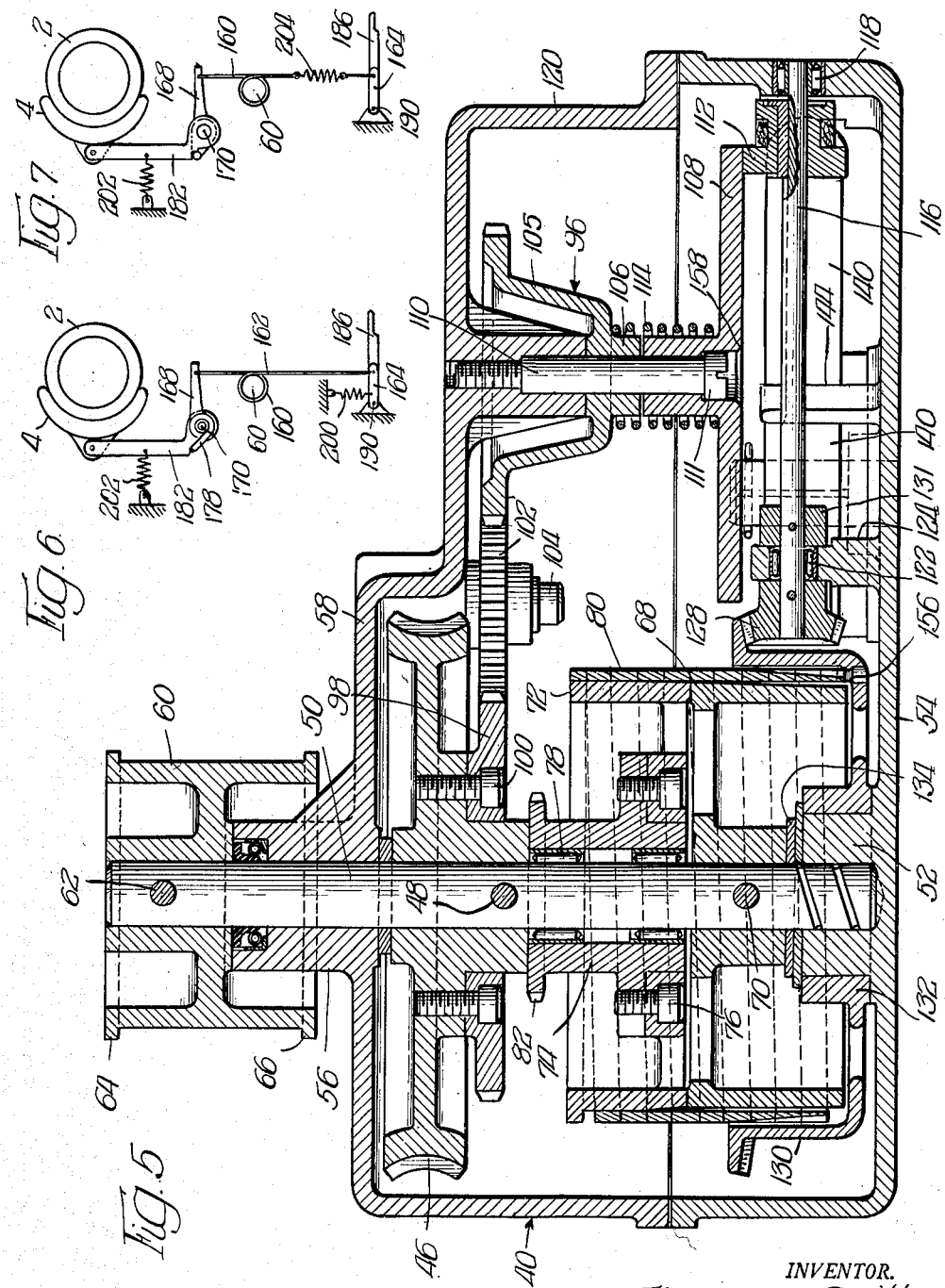

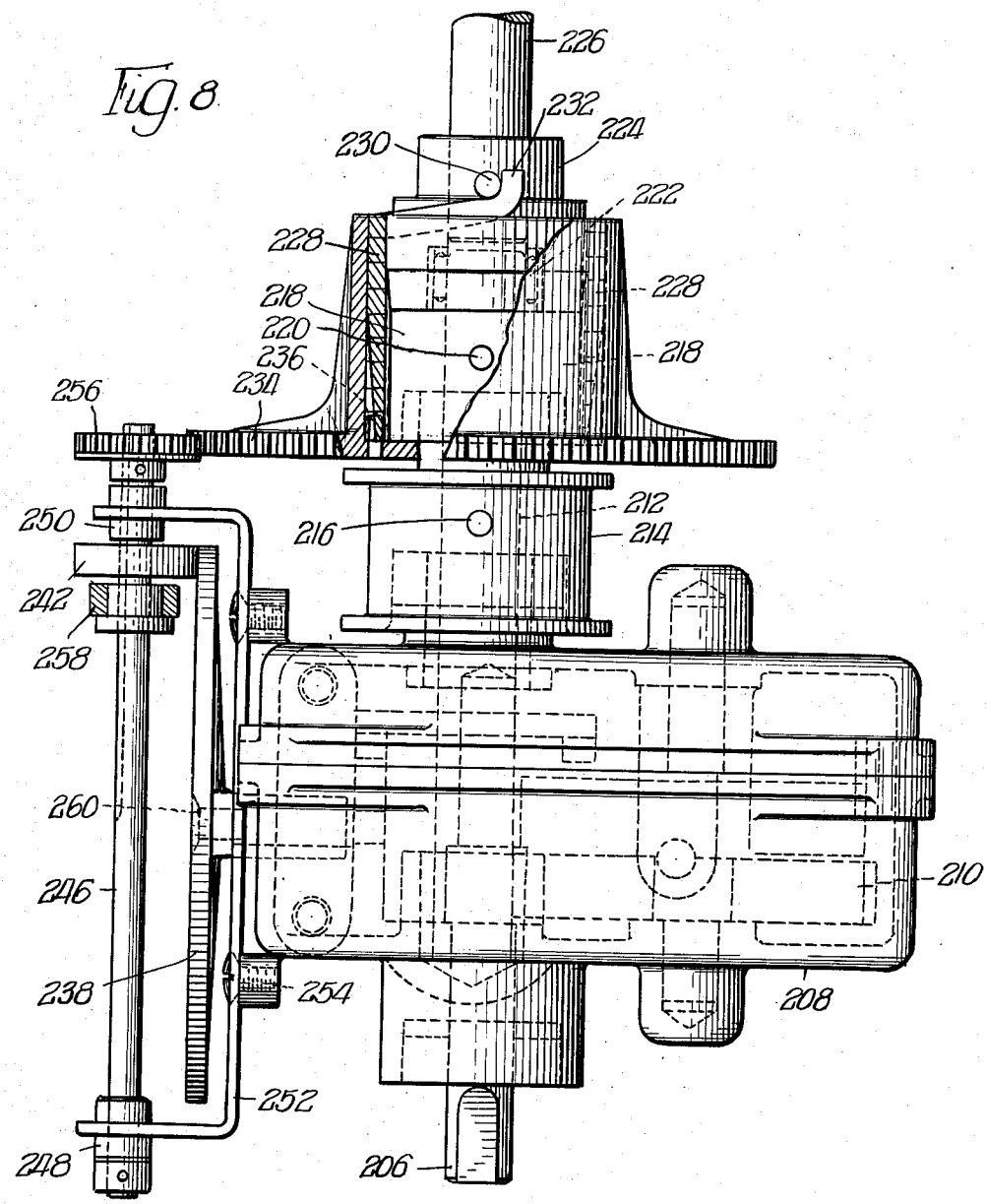

March 31, 1953 T. R. SMITH 2,632,967
IRONER UNIT
Filed Dec. 4, 1948 7 Sheets-Sheet 7
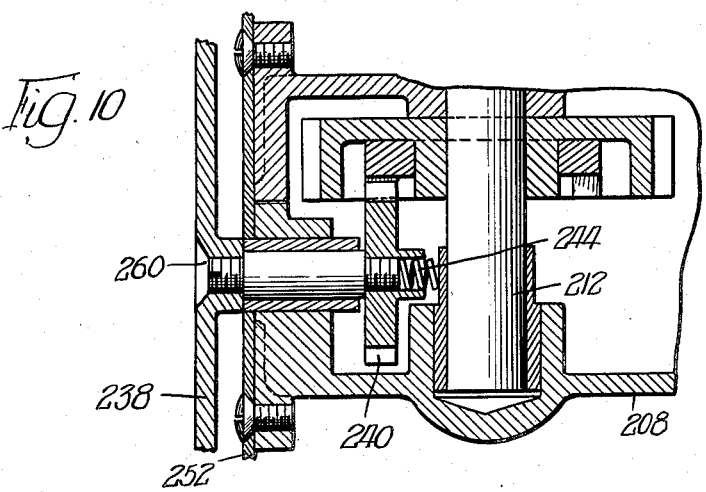
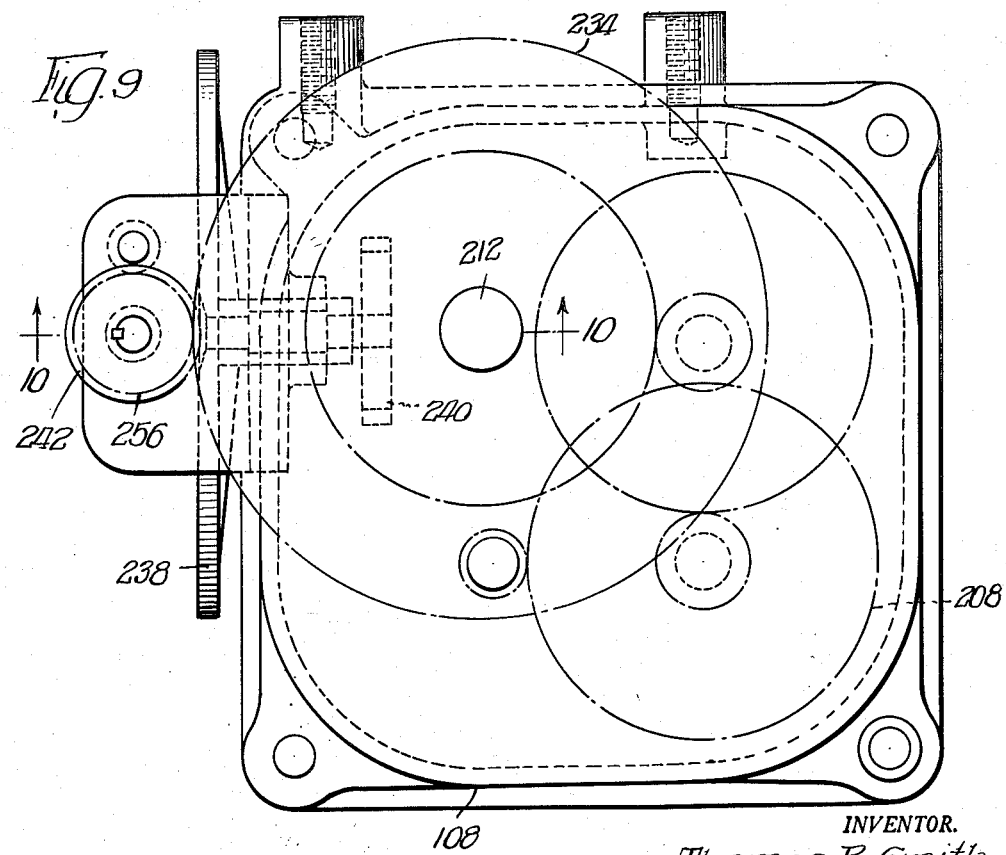
INVENTOR.
Thomas R. Smith,
BY Patented Mar. 31, 1953

2,632,967

UNITED STATES PATENT OFFICE 2,632,967

IRONER UNIT

Thomas R. Smith, Newton, Iowa, assignor to The Maytag Company, Newton, Iowa, a corporation of Delaware Application December 4, 1948, Serial No. 63,544

15 Claims. (Cl. 38—61)

1

The present invention relates to power transmitting devices and more particularly to such devices for use in ironer units and the like.

Among the objects of the present invention is to provide a power transmitting device wherein the power output may be readily and conveniently controlled with respect to the power input for driving any desired instrumentality at varying speeds.

Another object of the present invention is to provide a novel power transmitting device wherein means is provided on the output side for transmitting full power for operating any desired mechanism and additional means is provided on the output side thereof for transmitting variable power to some other mechanism in accordance with the adjustment of a variable speed device incorporated therein.

Still another object of the present invention is to provide a power transmitting device as immediately hereinabove described wherein a flexible friction clutch device is incorporated in driving relation to said full power transmitting means on the output side thereof whereby power in varying amounts may be taken from the clutch device to operate any desired mechanism.

A further object of the invention is to provide a novel power transmitting device embodying a variable speed device therein whereby torque in varying amounts may be taken from the output side thereof for driving some instrumentality, such as the roll of an ironer unit at varying speeds, and wherein further means is provided on the output side thereof in the form of a flexible friction clutch mechanism whereby torque in varying amounts may be taken from said device for operating some instrumentality, as, for example, applying a shoe at varying pressures to said roll.

The present invention further contemplates the provision of novel control means for use in an ironer unit or the like which can be readily operated by an operator for controlling the power or torque transmitting device and its associated flexible friction clutch mechanism to vary the speed of the roll and to apply the shoe at varying pressures to said roll.

The present invention is further characterized as having novel means incorporated in the variable speed device whereby the drive therethrough is rendered inoperative in its zero torque transmitting position to facilitate the operation of any instrumentality connected in driving relation thereto at the output side thereof.

A still further object of the invention is to provide a resilient torque transmitting device associated with the flexible friction clutch mechanism as hereinabove described which is adapted to yieldably transmit pressure in varying amounts between two instrumentalities such, for example, as the shoe and roll of an ironer unit, thus serving as a safety device in preventing the building up of excessive pressure therebetween which might otherwise damage the machine.

Other objects, features, capabilities and advantages are comprehended by the invention, as will later appear and as are inherently possessed thereby.

Referring to the drawings:

Figure 3 is a transverse cross-sectional view similar to that shown in Figure 2 of the drawings, but taken in a plane substantially midway between the ends of the ironer unit shown in Figure 1 of the drawings;

Figure 4 is a vertical cross-sectional view taken through the power transmission mechanism for the ironer shown in Figures 1 to 3 of the drawings;

Figure 5 is a horizontal cross-sectional view taken in the plane represented by line 5—5 of Figure 4 of the drawings;

Figure 6 is a diagrammatic view disclosing a suitable manual control for the ironer shoe of the ironer unit;

Figure 7 is a diagrammatic view showing a modified form of manual control for the ironer shoe of the ironer unit;

Figure 8 is a top plan view of a modified construction for the power transmitting unit adapted for use in an ironer unit such as shown in Figures 1 to 3 of the drawings;

Figure 9 is a view in end elevation of the power transmitting unit shown in Figure 8 of the drawings; and Figure 10 is a fragmentary cross-sectional view taken in the plane represented by line 10—10 of Figure 9 of the drawings.

Figure 1:
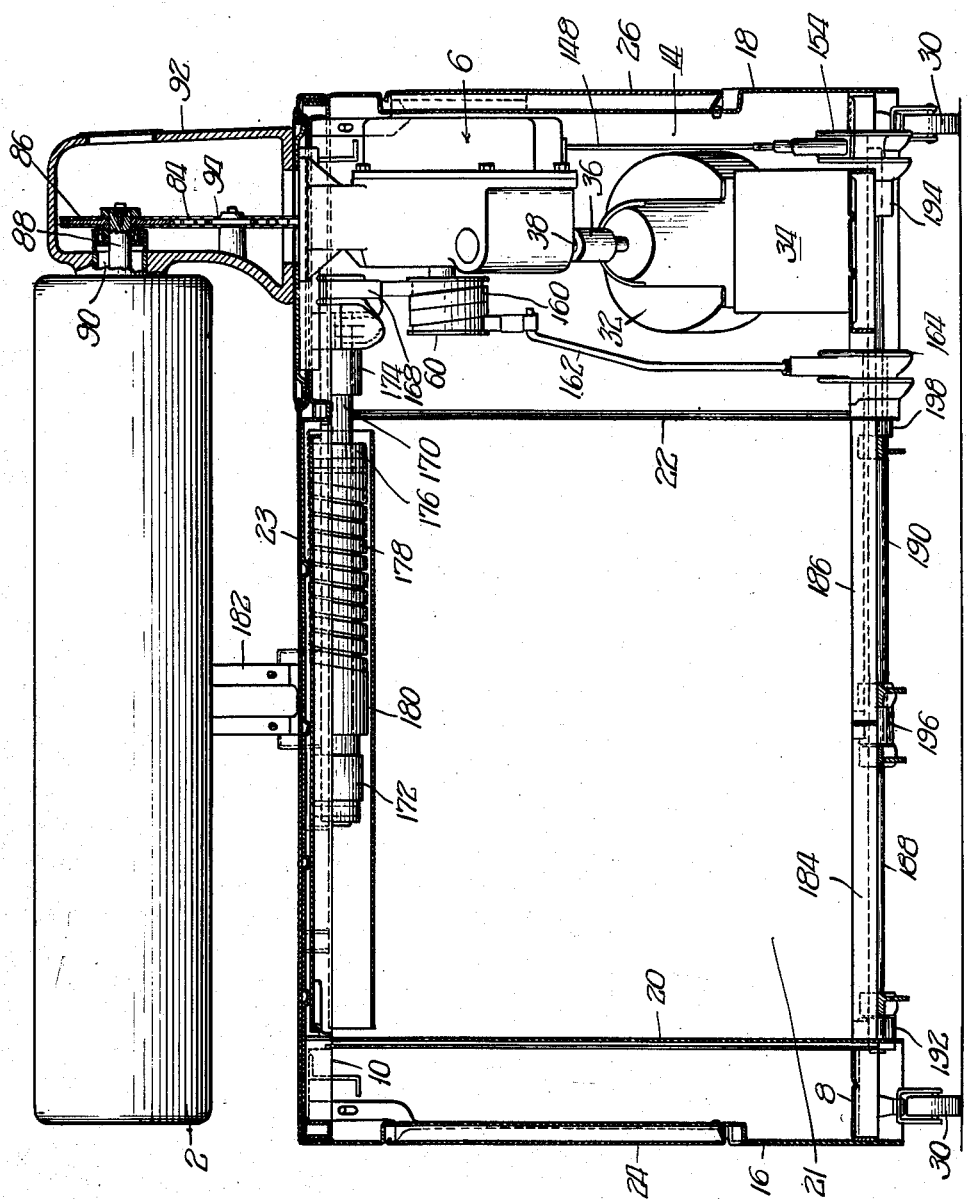
Figure 1 is a longitudinal cross-sectional view of an ironer unit embodying the present invention.
Figure 2:
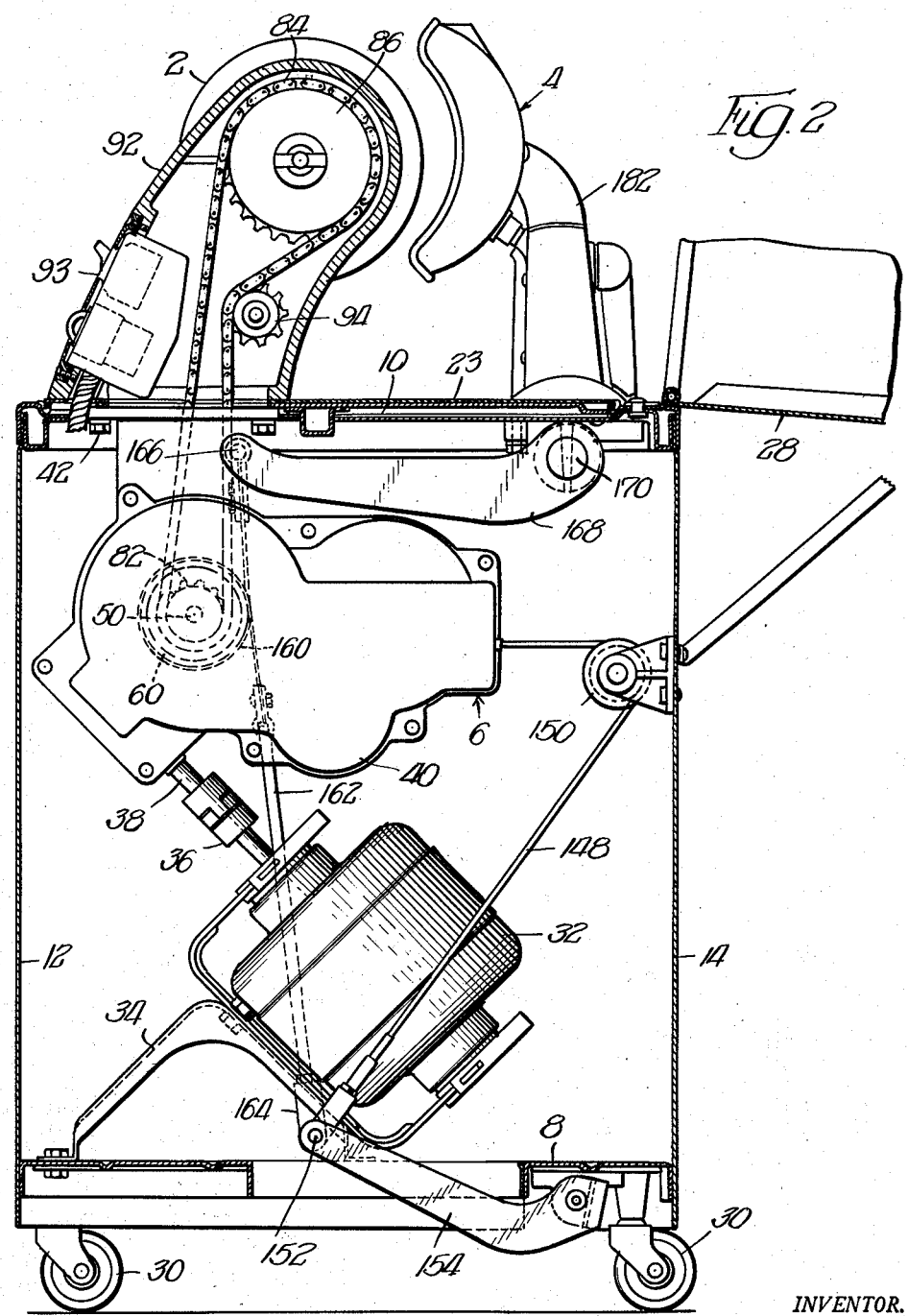
Figure 2 is a transverse vertical cross-sectional view taken in a plane adjacent the right hand end of the ironer unit shown in Figure 1 of the drawings.

Referring now more in detail to the drawings, an ironer unit embodying the present invention is disclosed in Figures 1 to 3 of the drawings as embodying a roll 2, a shoe 4, and power transmitting mechanism, generally referred to as 6, adapted to be controlled by an operator for rotating the roll 2 at varying speeds and for applying the shoe 4 at varying pressures to clothes and other such articles passing over the roll. The operating mechanisms for the ironer unit, including those specifically mentioned above, are mounted upon and supported by a frame structure which encloses certain of said mechanisms. This frame structure more particularly includes a bottom structural unit 8 and a top structural unit 10 interconnected by means of the front, back and side panels 12, 14 and 16 and 18, respectively, to form an enclosure partitioned vertically by the intermediate panels 20 and 22 to form the knee-hole 21 for the operator of the machine. A top panel 23 having suitable openings therein through which operating mechanism for the roll and shoe passes is provided in association with the top structural unit 10 and serves as a support for material being ironed. The side panels 16 and 18 are further formed with pivotally mounted trays 24 and 26, respectively, which when moved to their horizontal positions are adapted to serve as supports for clothing material, or the like, being ironed. The frame and cabinet construction is such that an operator seated in front of the machine may easily operate the controls for the roll and shoe by his or her feet while leaving the hands entirely free to handle the material being ironed by the machine. A cover 28, hinged at the rear of the cabinet structure, is provided for completely enclosing the roll and shoe when the machine is not in use. As shown, the ironer unit may be moved from place to place by means of the casters 30 located adjacent each of the corners of the cabinet structure and supported by means of the base structure 8.

The power transmitting mechanism includes a source of power, such as the motor 32 in the present illustration, which is mounted upon a bracket 34 secured to the base structure 8, and has the rotor shaft thereof coupled, as at 36, to shaft 38. The shaft 38 is mounted in suitable bearings in a gear casing 40 secured, as by means of bolts 42, or the like, to the top frame structure 10. The shaft 38 is provided with a worm 44 meshing with and driving a worm gear 46 which is secured, as by means of pin 48 or the like, to the shaft 50 journaled adjacent one end in a bearing 52 extending inwardly from the wall 54 of the casing and journaled adjacent its other end in the bearing 56 extending outwardly from the wall 58 of the casing. The shaft 50 extends outwardly beyond the bearing 56 and has a drum 60 secured thereto by means of a pin 62, or the like. The drum 60 is formed with the end peripheral flanges 64 and 66 for a purpose to be hereinafter more fully described.

Mounted on the shaft 50 adjacent the bearing 52 is a driving drum 68 having its central hub secured to the shaft by means of a pin 70, or the like. As will be clearly seen, the worm 44 is adapted to drive the worm wheel 46, as well as the drums 60 and 68, at the same speed and in the same direction upon operation of the motor 32. Adjacent the drum 68 is provided a driven drum 72 of substantially the same outer diameter as the drum 68 at their contiguous end portions and which has a separately formed central hub 74 secured thereto by means of the bolts 76, or the like. The hub 74 is rotatably mounted upon the shaft 50 by the needle bearings 78 whereby the drum 72 is rotatable about the shaft 50.

The drum 72 is driven by the driving drum 68 through a spirally wound flexible clutch element 80 which is preferably rectangular in cross section and has an inner diameter slightly greater than the outer diameter of the driving drum. This clutch element has one end anchored in any desired manner to the driven drum 72 and during its inactive condition, is free from contact with the driving drum 68. However, when the other, or free end of the clutch element 80 is moved in such a way as to contract the same, that portion of the clutch element which is wrapped around the driving drum 68 frictionally engages therewith, whereby torque is transmitted from the driving drum to the driven drum. By proper control of the speed of rotation of the free end of the clutch element 80, it is possible to cause rotation of the driving drum 72 at varying speeds up to the full speed of the driving drum 68.

Formed as an integral part of the hub 74 is a sprocket wheel 82 adapted to drive a sprocket chain 84 which passes upwardly from the sprocket wheel 82 through an opening in the top of the casing 40 and an aligned opening in the top panel 23 and it is adapted to drive the sprocket wheel 86 fixed to the end of the center shaft 88 for the roll 2. This center shaft 88 adjacent the sprocket wheel 86 is suitably mounted in bearings 90 provided in the head 92, which is secured to and extends upwardly from the top frame structure 10 and top panel 23 and forms a housing for the driving mechanism for the roll 2. The proper tensioning of the chain 84 is effected through the idler sprocket wheel 94 rotatably mounted on a stub shaft extending inwardly from one of the side walls of the head 92. The head 92 has electrical control means 93 mounted therein for energizing the drive motor 32 and the heating elements in the shoe 4.

The speed of rotation of the driven drum 72, as well as the roll 2 operatively connected thereto through the sprocket chain 84, is controlled by a variable speed device 96 which comprises a timing gear 98 at its input side mounted upon and secured to the worm gear 46 by means of the bolts 100, or the like. This timing gear, accordingly, rotates at the same speed and in the same direction as the worm wheel 46 and meshes with an idler gear 102 mounted upon a stub shaft 104 extending inwardly into the casing 40 from the wall 58. The idler gear 102 meshes with and drives a gear 105 loosely coupled, by the axially arranged splines 106, to the friction disc 108, the friction disc 108, as well as the gear 105, being rotatably mounted upon the shaft 110 secured to and extending inwardly from the wall 58 of the casing 40. The friction disc 108 is biased into cooperative frictional engagement with a friction wheel 112 by means of the coil spring 114 interposed between the gear 105 and the friction disc 108, the axial movement of the friction disc 108 in the direction of the friction wheel 112 being limited by the head 111 formed at the end of the shaft 110. The friction wheel 112 is keyed to, but slidable upon, shaft 116 which has one end thereof journaled in the needle bearings 118 disposed in the end wall 120 of the casing 40, and the other end thereof journaled in the needle bearings 122 mounted in the bearing element 124 extending inwardly from the top wall 126 of the casing 40. Mounted on and secured to the shaft 116 on one side of the bearing element 124 is a bevel pinion 128 held in proper meshing relation with a ring gear 130 by means of the collar 131 which is mounted upon and secured to the shaft 116 on the other side of the bearing element 124. The ring gear 130 is cup-shaped and is formed with a central hub 132 for rotatably mounting the ring gear on the bearing 52. Thrust washers 134 are interposed between the hub 132 and the hub of the driving drum 68 for positioning the ring gear in the assembly.

The friction wheel 112 is moved along the shaft 116 at an angle of 90° to the axis of rotation of the friction disc 108 by means of a shifting fork 136 having a lug 138 depending therefrom, to which is connected one end of a spiral spring 140. The other end of the spiral spring is anchored or connected to the lug or projection 142 extending inwardly of the wall 54 of the housing 40, the said spiral spring being wound to normally exert a force tending to move the friction wheel 112 to the left, as viewed in Figures 4 and 5 of the drawings. Movement of the friction wheel 112 to the left beyond its neutral position in opposed relation to the shaft 110 is limited, however, by a stop member 144 extending inwardly from the wall 54 of the casing which is adapted to engage with the shifting fork 136.

The friction wheel 112 is shifted radially with respect to the friction disc 108 by means of the movable rod 146 connected to the shifting fork 136. The rod 146 is mounted adjacent one end in the stop lug 144 and adjacent its other end in the wall 120 and has the outer end thereof connected to a cable 148 which passes over pulley 150 and has its other end connected, as at 152, to the lever or crank-arm 154.

The ring gear 130 is provided with an inwardly extending lug 156 which is adapted to engage a notch or recess in the free end of the flexible clutch element 80, so that as the ring gear is rotated by the variable speed device in the same direction as the driving drum 68, the lug 156 moves the free end of the flexible clutch element to start winding the same into engagement with the outer cylindrical surface of the driving drum. As soon as sufficient movement has been applied to the flexible clutch element to engage the driving drum, the motion of the driving drum causes it to grip tighter and torque is transmitted therethrough to the driven drum 72. Thus, the driven drum starts to rotate, which in turn starts to rotate the ironer roll 2. The speed of rotation will be in accordance with the speed of the free end of the flexible clutch member and this will be a function of the speed of rotation of the friction wheel 112. It will be apparent that inasmuch as the friction disc 108 is directly connected to the timing gear 98, the same will rotate at a constant speed. When the friction wheel 112 is in the position as shown in Figure 5 and in the dotted position in Figure 4 of the drawings, the same will be rotated at its maximum speed inasmuch as the same is at the periphery of the friction disc 108. Consequently, the bevel gear 128 rotates the ring gear 130 at its maximum speed. Under these conditions, the lug 156 on the ring gear 130 is moved in such a manner as to cause the flexible clutch member 80 to wind up and grip the driving drum 68 over its entire periphery and this will cause the driven drum 72 to rotate at its maximum speed and to transmit maximum torque which, under the conditions present, will be the same as for the driving drum 68. It is also to be noted that under these conditions the driving and driven drums, as well as the ring gear, are all rotated at the same speed and in the same direction. Furthermore, the speed of rotation of the driven drum 72 and the ring gear 130 will always be substantially the same under varying speed conditions, while the speed of the driving drum 68 will always be substantially constant.

When the friction wheel 112 is returned to its neutral position in opposed relation to the axis of the shaft 110, the roll 2 will be stationary. In order to provide a construction, however, in which the roll 2 may be easily turned manually, the central portion of the friction disc 108 is recessed axially, as at 158, so that there is no positive engagement between the friction disc 108 and friction wheel 112 when the friction wheel 112 is in its neutral position. This neutral position is the position the friction wheel 112 will normally take when the operator is not ironing, or desires to stop one particular ironing operation.

As will be apparent, downward movement of the lever 154, as shown in Figure 2 of the drawings, causes the shifting fork 136 to move the friction wheel 112 toward the outer periphery of the friction disc 108. As the friction wheel leaves its central position, it is rotated relatively slowly by the disc 108 because the circumferential speed of the contacting surface is low and, accordingly, the ring gear 130 is rotated in accordance with the position of the friction wheel 112 with respect to the friction disc 108. As the ring gear moves, it causes the friction clutch member 80 to wind up and grip the driving drum 68, which in turn delivers torque to the driven drum 72, as previously described. This causes the driven drum to rotate at substantially the speed of the ring gear 130 and the amount of slippage between the driven drum 68 and the clutch member 80 is increased or decreased depending upon control conditions. If the speed of rotation of the driven gear tends to get ahead of, or be faster than the ring gear, the clutch member 80 automatically releases its grip to a slight extent on the driving drum 68 to cause slippage which will reduce the speed of the driven drum 72 to the speed of the ring gear 130. In a similar manner, should the speed of the driven drum 72 be slower than the speed of the ring gear 130, the ring gear will cause the clutch member 80 to tighten its grip slightly on the driving drum 68, whereby the speed of the driven drum is increased to correspond substantially to the speed of the ring gear. It will be seen that the ironing roll is rotated at a speed substantially equal to the speed of rotation of the ring gear 130 and that the speed of rotation of the ring gear is a function of the peripheral velocity of the friction wheel 112, which is dependent upon its relative position with respect to the constantly rotated friction disc 108.

Loosely wrapped about the drum 60 between the peripheral flanges 64 and 66 is a friction clutch element 160 which has one end thereof connected to a link 162 pivotally connected to a crank arm or lever 164, the other end thereof being pivotally secured, as at 166, to one end of the lever 168 which is fixed at one end to crank shaft 170 journaled in bearings 172 and 174 depending from the top frame structure 10. Rotary movement of the shaft 170 is transferred through a clutch 176 to one end of a spirally wound preloaded spring 178 mounted co-axially on the shaft 170. The opposite end of the spring 178 engages the hub 180 of a standard 182 pivoted for movement about shaft 170 and which pivotally carries the shoe 4 at its upper end.

As will be apparent, as the lever 164 is moved downwardly, the flexible clutch element 160 is tightened on the constantly rotating drum 60 whereby the lever 168 rotates the crank shaft 170 which, through the medium of the spirally wound pre-loaded spring 178, moves the standard 182 to cause movement of the shoe 4 toward the roll 2. The friction between the drum 60 and the friction clutch element 160 multiplies the original downward force applied to the lever 164 to cause the shoe 4 to move against the ironer roll to apply the proper pressure for ironing. By controlling the proper amount of downward pressure on the lever 164, the pressure applied by the shoe to the roll may be varied. When the proper pressure is applied to the roll, the drum 60 slips and continues to slip while, at the same time, maintaining the pressure between the roll and shoe. The spring 178 which acts as a resilient torque transmitting device also acts as a safety means for the mechanism described, for the reason that when the shoe 4 is moved into association with the roll 2, any force applied to the crank shaft 170 above that required by the shoe, is absorbed by the spring 178.

When downward pressure is removed from the lever 164, the same will release the tension of the clutch element 160 on the drum 60, thus permitting return movement of the shoe 4 away from the roll 2.

The crank levers 154 and 164 are controlled by foot pedals 184 and 186, respectively, mounted upon and fixed in relation to the concentrically arranged shafts 188 and 190, respectively, extending longitudinally of the ironer unit and which are journaled in suitable bearings depending from the bottom frame structure 8. The shaft 188 is journaled adjacent its ends in the bearings 192 and 194 and has the lever 154 connected to one end thereof which extends to the right beyond the bearing 194. The shaft 190, in the form of a sleeve, is journaled in the bearing 196 adjacent one end and in the bearing 198 adjacent its other end, the said shaft or sleeve extending to the right beyond the bearing 198 and being connected to the lever 164.

The shoe 4, as well as the control for the clutch element 160 may be returned to their normal position whereby the shoe 4 is out of cooperative association with the roll 2 and the clutch element 160 is out of its gripping relation with the drum 60 by either of the two assemblies shown diagrammatically in Figures 6 and 7. As shown in Figure 6, downward movement of the foot pedal 186 rotates sleeve 190 to move the crankarm 164 downwardly to tighten the flexible clutch element 160 about the drum 60. This causes downward movement of the lever 168 which, through the action of the spring 178, causes the standard 182 to be pivoted about the shaft 170 to move the shoe 4 into pressing relation with the roll 2. In this arrangement for the control mechanism, when pressure is removed from the foot pedal 186, the lower crankarm 164 moves upwardly under the action of the spring 200 to release the flexible clutch element 160 and, at the same time, the spring 202 causes the ironer shoe 4 to be moved away from the roll 2.

It is possible, however, to eliminate the preloaded spring 178 in the control mechanism, as illustrated in Figure 7 of the drawings, and to connect the crank-shaft 168 directly to the standard 182 for the ironer shoe 4 by providing a scale spring 204 between the crank-arm 164 and the clutch element 160, so that the drag of the clutch element can never exceed the pull of the spring 204. As in the illustration shown in Figure 6 of the drawings, the spring 202 is used in this modified form of control for releasing the shoe 4 from the roll when pressure is removed from the foot pedal 186.

If desired, the power transmitting device for operating the roll and shoe of the ironer unit may take the form as shown in Figures 8 to 10, inclusive, of the drawings, wherein the power drive is through a shaft 206 driven at relatively high speed by any source of power, such as an electric motor or the like. This shaft is mounted in a gear casing 208 in which there is provided a multiple reduction gear unit 210 adapted to drive a shaft 212 at a relatively low speed. This shaft extends outwardly beyond the casing 208 in substantial alignment with the input shaft 206, and has a cylindrical drum 214 connected thereto by means of a pin 216, or the like. This drum corresponds to drum 60 of the previously described embodiment and is adapted to have a flexible clutch element, such as the clutch element 160, wrapped around the same for the purpose of moving the ironer shoe against the roll by manual manipulation of the flexible clutch element, all as described in the previous illustration of the invention.

The drive shaft 212 also has a second drum 218 connected thereto by means of a pin 220, or the like. Needle bearings 222 are provided adjacent the end of the shaft 212 to provide a rotatable mounting for a drum 224 fixed to the end of a driven shaft 226, which is in substantial alignment with the shaft 212. The drums 218 and 224 have external friction surfaces of substantially the same diameter and are embraced by a spirally wound friction clutch element 228 of the same type as shown in the previously described embodiment, and which normally has clearance with the driving drum. The shaft 226 carries a pin 230 adapted to engage the axially disposed end 232 of the flexible clutch element 228, whereby a driving connection may be effected between the driving drum 218 and the driven drum 224 connected to the driven shaft 226. Shaft 226 may have a sprocket wheel mounted thereon whereby the ironer roll may be rotated at varying speeds through the medium of a sprocket chain, all as hereinbefore described.

In this illustration of the invention, the flexible clutch element 228 is controlled by the ring gear 234, mounted in embracing relation to the flexible clutch element 228, and which is provided with a lug 236 adapted to engage in a notch or recess provided in the free end of the clutch element 228 to control the frictional clutching relation between the friction clutch element 228 and drum 218 whereby the shaft 226 is rotated at varying speeds in accordance with the speed of rotation of the ring gear 234. A variable speed device for controlling the operation of the ring gear 234, conforming in a good many respects to the variable speed device of the first described embodiment, is provided in this modified structure to effect a variable drive between the driving shaft 212 and the driven shaft 226. Such variable speed device comprises a friction disc 238 mounted for axial movement in the end wall of casing 208 and being driven through the reduction gearing by means of the gear 240, the friction disc being biased into frictional engagement with the friction wheel 242 by means of the spring 244. The friction wheel 242 is keyed to, but slidable upon, the shaft 246 mounted, as at 248 and 250, on the bracket 252, secured as by means of the screws 254 on the housing 208. The shaft 246 has the pinion 256 mounted adjacent one end thereof which meshes with and rotates the ring gear 234. Friction wheel 242 is shifted axially of the shaft 246 by the shifting fork 258 which may be controlled in a manner heretofore described in connection with the control of the shifter fork 136 of the previously described embodiment.

As in the preferred form of the invention, the friction disc 238 is centrally recessed at 260, whereby the ironer roll may be conveniently and easily rotated when the friction wheel 242 is in its neutral position. The operation of this modified form for the power transmitting device is substantially the same as the preferred form of the invention, the drive for shaft 226 being varied as desired by control of the relative position of friction wheel 242 with respect to the friction disc 238, whereby the ironer roll can be operated at varying speeds as desired by the operator. As in the first described embodiment, the control of the ironer roll, as well as the ironer shoe, may be effected by means of foot pedals conveniently disposed for operation by the operator at the front of the machine.

While I have herein described and upon the drawings shown illustrative embodiments of the invention, it is to be understood that the invention is not limited thereto, but may comprehend other constructions, arrangements of parts, details and features without departing from the spirit of the invention.

It is claimed:

1. In a power transmitting device, the combination of driving means including a driving shaft, adjacently disposed driving and driven drums mounted coaxially with respect to said shaft, means for connecting one of said drums in driving relation to said driving shaft, a flexible clutch element of the coil type embracing said drums, said clutch element being connected adjacent one end thereof to said driven drum and being adapted to frictionally engage said driving drum, a variable speed device having a driven element connected to the other end of said clutch element adapted to be coaxially driven in the same direction as said driving drum to control the extent of contraction of said clutch element on said drum to effect a variable drive from said driving drum to said driven drum, and means for rotating the coaxial element of said variable speed device at a maximum speed equal to the speed of said driving drum from said driving shaft.

2. In a power transmitting device, the combination of a driving member and a driven member, a flexible clutch element of the coil type embracing said driving and driven members, said clutch element being connected adjacent one end thereof to said driven member and being adapted to frictionally engage said driving member, a variable speed device having a driven element connected to the other end of said clutch element adapted to be coaxially driven in the same direction as said driven member to control the extent of contraction of said clutch element on said driven member to effect a variable drive from said driving member to said driven member, and means for rotating said driven element at a maximum speed equal to that of said driving member.

3. In a power transmitting mechanism, the combination of a driving shaft, adjacently disposed driving and driven drums mounted coaxially with respect to said shaft, means for connecting one of said drums in driving relation to said driving shaft, means for rotatably mounting the other of said drums with respect to said shaft, a flexible clutch element of the coil type embracing said drums, said clutch element being secured adjacent one end to said driven drum and being adapted to frictionally engage said driving drum, a variable speed device having a driven element connected to the other end of said clutch element adapted to be coaxially driven in the same direction as said driving drum to control the extent of contraction of said clutch element on said drum to effect a variable drive from said driving drum to said driven drum, and means for rotating the coaxial element of said variable speed device at a maximum speed equal to the speed of said driving drum from said driving shaft.

4. In a power transmitting mechanism, the combination of a driving member and a driven member, a flexible clutch element of the coil type secured adjacent one end thereof to said driven member and adapted to frictionally engage said driving member, a variable speed device including driving and driven elements, said driven element being mounted coaxially with respect to said driven member, means for operatively connecting said driven element to the other end of said clutch element, means for driving said variable speed device whereby said driven element is rotated in the same direction of rotation as said driving member to control the frictional contact pressure of said clutch element on said driving member, said driven element having a maximum speed equal to that of said driving member, and means for rendering the driving connection between said driving and driven elements inoperative substantially at zero speed of said driven element.

5. In a power transmitting mechanism, the combination of a driving member and a driven member, a flexible clutch element of the coil type secured adjacent one end thereof to said driven member and adapted to frictionally engage said driving member, a variable speed device having a driving connection at its output side with the other end of said clutch element, said driving connection including a driven element mounted coaxially with respect to said driven member and rotatable in the same direction as said driven member, means for driving said variable speed device, said variable speed device including a disc, a wheel member having peripheral frictional engagement with the face of said disc, and means for moving said wheel member radially with respect to said disc member whereby the maximum speed of said driven element is equal to that of said driving member, said disc member having an axially arranged recess for rendering the frictional drive between said members inoperative when said wheel member is substantially in opposed relation to the axis of said disc member.

6. In a power transmitting mechanism, the combination of a driving member and a driven member, a flexible clutch element of the coil type secured adjacent one end thereof to said driven member and adapted to frictionally engage said driving member, a variable speed device having a driving connection at its output side with the other end of said clutch element, said driving connection including a driven element mounted coaxially with respect to said driven member and rotatable in the same direction as said driven member, means for driving said variable speed device, said variable speed device including a disc, a wheel member having peripheral frictional engagement with the face of said disc, means for normally positioning said wheel member whereby the same is substantially in opposed relation to the axis of said disc member, and means for moving said wheel member from said normal position radially of said disc member whereby the maximum speed of said driven element is equal to that of said driving member, said disc member having an axially arranged recess for rendering the friction drive between said members inoperative when said wheel is in said normal position.

7. In an ironer unit, the combination of a rotatable roll, a shoe mounted for movement into and out of cooperative relation with said roll, a power transmitting device for operating said roll and shoe, said power transmitting device comprising driving means including a rotatable driving member, a rotatable driven member for driving said roll, a flexible clutch element of the coil type connected adjacent one end to said driven member and being adapted to frictionally engage said driving member, a variable speed device having a driven element connected to the other end of said clutch element adapted to be coaxially driven in the same direction as said driving member to control the extent of contraction of said clutch element on said driving member to effect a variable drive from said driving member to said driven member, means for rotating said driven element at a maximum speed equal to that of said driving member, and means for moving said shoe into cooperative relation with said roll and for varying the pressure applied by said shoe to said roll including a flexible clutch element wrapped around said driving member, said last named means further including a connection between one end of said last named clutch element and said shoe, and means connected to the other end of said last named clutch element adapted to be operated by the operator of the ironer unit for varying the cooperative frictional engagement of said last named clutch element with said driving member.

8. In an ironer unit, the combination of a rotatable roll, a shoe mounted for movement into and out of cooperative relation with said roll, a power transmitting device for operating said roll and shoe, said power transmitting device comprising driving means including a rotatable driving member, a rotatable driven member for driving said roll, a flexible clutch element of the coil type connected adjacent one end to said driven member and being adapted to frictionally engage said driving member, a variable speed device having a driven element connected to the other end of said clutch element adapted to be coaxially driven in the same direction as said driving member to control the extent of contraction of said clutch element on said driving member to effect a variable drive from said driving member to said driven member, means for rotating said driven element at a maximum speed equal to that of said driving member, means for controlling the operation of said variable speed device to vary the rotation of said roll, means for moving said shoe into cooperative relation with said roll and for varying the pressure applied by said shoe to said roll including a flexible clutch element wrapped around said driving member, said last named means further including a connection between one end of said last named clutch element and said shoe, and means connected to the other end of said last named clutch element adapted to be operated by the operator of the ironer unit for varying the cooperative frictional engagement of said last named clutch element with said driving member.

9. In an ironer unit, the combination of a rotatable roll, a shoe mounted for movement into and out of cooperative relation with said roll, a power transmitting device for operating said roll and shoe, said power transmitting device comprising driving means including a rotatable driving member having a drum mounted thereon, a rotatable driven member for driving said roll, a flexible clutch element of the coil type connected adjacent one end to said driven member and being adapted to frictionally engage said driving member, a variable speed device having a driven element connected to the other end of said clutch element adapted to be coaxially driven in the same direction as said driving member to control the extent of contraction of said clutch element on said driving member to effect a variable drive from said driving member to said driven member, means for rotating said driven element at a maximum speed equal to that of said driving member, and means for moving said shoe into cooperative relation with said roll and for varying the pressure applied by said shoe to said roll, said last named means including a flexible clutch element wrapped around said drum, said last named means further including a connection between one end of said last named clutch element and said shoe, and means connected to the other end of said last named clutch element adapted to be operated by the operator of the ironer unit for varying the cooperative frictional engagement of said last named clutch element with said drum, said connection having a resilient torque transmitting device interposed between said last named clutch element and said shoe.

10. In a power transmitting mechanism, the combination of a source of power including a reduction gear mechanism, a driving member rotatably driven by said mechanism, a member driven by said driving member, a flexible clutch element of the coil type secured adjacent one end thereof to said driven member and adapted to frictionally engage said driving member, a variable speed device driven from said reduction gear mechanism and having a driven element connected to the other end of said clutch element adapted to be coaxially driven in the same direction as said driving member to control the extent of contraction of said clutch element on said driving member to effect a variable drive from said driving member to said driven member, and means for rotating said driven element at a maximum speed equal to the speed of said driving member.

11. In a power transmitting mechanism, the combination of a source of power including a reduction gear mechanism, a driving shaft driven by said mechanism and having a direct power take-off, a shaft disposed in substantial alignment with said driving shaft and driven thereby, adjacently disposed drums connected to said driving and driven shafts, a flexible clutch element of the coil type connected adjacent one end to said driven drum and being adapted to frictionally engage said driving drum, and a variable speed device driven from said reduction gear mechanism having a driven element at its output side embracing said flexible clutch element and being connected to the other end thereof, said driven element being coaxially driven in the same direction as said driving drum to control the extent of contraction of said clutch element on said drum to effect a variable drive from said driving drum to said driven drum, and means for rotating said driven element at a maximum speed equal to that of said driving drum.

12. In an ironer unit, the combination of a pressing surface, a shoe movable into and out of engagement with said surface, a control member for said shoe, a power transmission with a rotatable power shaft extending therefrom, a flexible clutch embracing said shaft and having end portions, one of said end portions being connected to said shoe and the other of said end portions being connected to said control member, and yieldable means disposed between said control member and said other end of said clutch for limiting the pressure applied to said surface whereby the operator of the ironer unit may vary the cooperative frictional engagement of said clutch with said shaft to vary the pressure of said shoe on said pressing surface.

13. In an ironer unit, the combination of a rotatable roll, a shoe mounted for movement into and out of cooperative relation with said roll, a power transmitting device for operating said roll and shoe including a driving member, means connected to said shoe for moving the same into cooperative relation with said roll and for varying the pressure applied by said shoe to said roll, said means including a flexible clutch element wrapped around said driving member, and means connected to said clutch element for varying the cooperative frictional relation between said clutch element and said driving member, said last named means including control means operable by the operator of the ironer unit for varying the cooperative frictional engagement of said clutch with said driving member to vary the pressure of said shoe on said roll, and resilient means interposed between said control means and said clutch element.

14. In a power transmission, the combination of driving means including a rotatable substantially constant speed driving member, a rotatable driven member axially aligned with said driving member and adapted to be driven in the same direction but at selected variable speeds, a flexible clutch element of the coil type having one end thereof secured to said driven member and its other end encompassing said driving member, a variable speed device having a driven element connected to the other end of said clutch element and coaxially rotatable in the same direction with said driving member, and means for rotating said element of said variable speed device in that direction to control the frictional contact pressure of said clutch element on said driving member to drive said driven member in the same direction at a speed equal to the speed of said driven element, said driven element having a maximum speed equal to that of said driving member.

15. In a power transmitting mechanism, the combination of a substantially constant speed driving shaft, adjacently disposed driving and driven drums mounted coaxially with respect to said shaft, means for connecting said driving drum to said shaft to rotate therewith, means for rotatably mounting said driven drum with respect to said shaft, a flexible coil type clutch member encompassing said drums, said clutch member having one end secured to said driven drum and its other end being adapted to frictionally engage said constant speed driving drum, a variable speed device including a constant speed element and a variable speed element, said variable speed element being connected to the other end of said clutch member and coaxially rotatable in the same direction as said driving drum, means for rotating said constant speed element from said constant speed shaft, and means for selecting the speed of rotation of said variable speed element to control the frictional contact pressure between said clutch member and driving drum to permit slippage therebetween to rotate said driven drum at a speed equal to that of said variable speed element, said variable speed element having a maximum speed equal to that of said driving drum.

THOMAS R. SMITH.

REFERENCES CITED

The following references are of record in the file of this patent:

UNITED STATES PATENTS

| Number | Name | Date |
| --- | --- | --- |
| 429,153 | Porter | June 3, 1890 |
| 583,500 | Mueller | June 1, 1897 |
| 801,728 | Lindsay | Oct. 10, 1905 |
| 962,289 | Allen | June 21, 1910 |
| 1,417,625 | Mikulasek | May 30, 1922 |
| 2,260,799 | Bush | Oct. 28, 1941 |
| 2,372,775 | Gerhardt et al. | Apr. 3, 1945 |
| 2,475,432 | Marihart | July 5, 1949 |

FOREIGN PATENTS

| Number | Country | Date |
| --- | --- | --- |
| 343,557 | Canada | July 31, 1934 |